US012595843B2

(12) United States Patent
Gassmann et al.

(10) Patent No.: US 12,595,843 B2
(45) Date of Patent: Apr. 7, 2026

(54) ELECTRIC DRIVE FOR A VEHICLE

(71) Applicant: GKN Automotive Limited, Birmingham (GB)

(72) Inventors: Theodor Gassmann, Siegburg (DE); John Foulsham, Hampshire (GB); Ian Stone, Oxfordshire (GB); Daniel Beeby, Norfolk (GB)

(73) Assignee: GKN Automotive Limited, Birmingham (GB)

( * ) Notice: Subject to any disclaimer, the term of this patent is extended or adjusted under 35 U.S.C. 154(b) by 306 days.

(21) Appl. No.: 18/570,096

(22) PCT Filed: Jul. 30, 2021

(86) PCT No.: PCT/EP2021/071444
§ 371 (c)(1),
(2) Date: Dec. 14, 2023

(87) PCT Pub. No.: WO2023/006218
PCT Pub. Date: Feb. 2, 2023

(65) Prior Publication Data
US 2025/0137530 A1 May 1, 2025

(51) Int. Cl.
*F16H 57/04* (2010.01)
*B60K 1/00* (2006.01)
*F16H 57/02* (2012.01)

(52) U.S. Cl.
CPC ........... *F16H 57/0476* (2013.01); *B60K 1/00* (2013.01); *F16H 57/02* (2013.01); *F16H 57/0412* (2013.01); *F16H 57/043* (2013.01);

*F16H 57/0435* (2013.01); *F16H 57/0441* (2013.01); *F16H 57/0453* (2013.01);
(Continued)

(58) Field of Classification Search
CPC ............. F16H 57/0476; F16H 57/0412; F16H 57/043; F16H 57/0435
See application file for complete search history.

(56) References Cited

U.S. PATENT DOCUMENTS 10,442,285 B2 10/2019 Tokozakura et al.
2004/0154846 A1 8/2004 Kira
(Continued)

FOREIGN PATENT DOCUMENTS

EP 3517335 A1 7/2019
JP H0898464 A 4/1996
(Continued)

OTHER PUBLICATIONS

International Search Report and Written Opinion for PCT/EP2021/071444 mailed Apr. 8, 2022 (10 pages).
(Continued)

*Primary Examiner* — Huan Le
(74) *Attorney, Agent, or Firm* — Reising Ethington P.C.

(57) ABSTRACT

An electric drive for a vehicle comprises a housing, an electric machine with a stator connected to the housing and including stator end-windings, a rotor rotatable relative to the stator, and a driveshaft connected to the rotor and rotatably supported in the housing about an axis of rotation, a transmission to transmit a rotary movement from the driveshaft to drive a driveline of the vehicle, and a hydraulic circuit for circulating a fluid.

17 Claims, 3 Drawing Sheets

(52) U.S. Cl.
CPC .................. *B60K 2001/006* (2013.01); *F16H 2057/02034* (2013.01); *F16H 2057/02043* (2013.01)

(56) References Cited

U.S. PATENT DOCUMENTS

| | | | |
|---|---|---|---|
| 2013/0038151 A1* | 2/2013 | Ohashi .................. | H02K 7/086 310/59 |
| 2015/0330493 A1 | 11/2015 | Pritchard | |
| 2016/0178548 A1 | 6/2016 | Berry | |
| 2018/0241288 A1 | 8/2018 | Murakami et al. | |
| 2019/0229582 A1 | 7/2019 | Ito et al. | |
| 2021/0001714 A1* | 1/2021 | Oechslen .............. | B60K 11/02 |
| 2021/0189687 A1* | 6/2021 | Minamiura .......... | F16H 57/043 |

FOREIGN PATENT DOCUMENTS

| | | |
|---|---|---|
| JP | 2006312353 A | 11/2006 |
| JP | 2009118666 A | 5/2009 |
| JP | 2017100700 A | 6/2017 |
| WO | 2018203798 A1 | 11/2018 |
| WO | WO2019208081 A1 | 10/2019 |

OTHER PUBLICATIONS

JP Office Action for JP Application No. 2024-505442 dated Jan. 14, 2025 (6 pages).

\* cited by examiner

ELECTRIC DRIVE FOR A VEHICLE

CROSS-REFERENCE TO RELATED APPLICATIONS

This application is a national stage of, and claims priority to, Patent Cooperation Treaty Application No. PCT/EP2021/071444, filed on Jul. 30, 2021, which application is hereby incorporated herein by reference in its entirety.

BACKGROUND

EP 3 517 335 A1 discloses an electric vehicle including a power control unit, a driving motor, a first cooling channel fitted with a first pump that causes a first cooling liquid cooled in a first heat exchanger to flow through the power control unit and a second heat exchanger in this order and return to the first heat exchanger, and a second cooling channel fitted with a second pump that causes a second cooling liquid cooled by the first cooling liquid in the second heat exchanger to flow through the driving motor and return to the second heat exchanger. The second pump starts or stops circulation of the second cooling liquid, or increases or reduces a circulation volume of the second cooling liquid, based on one or both of the temperature of the power control unit and the temperature of the first cooling liquid.

US 2018/241288A1 discloses a rotating electrical machine cooling structure such that a cooling medium is supplied by a pump to a stator and rotor of a rotating electrical machine, thereby cooling the stator and rotor, the rotating electrical machine cooling structure comprising a first passage that supplies the cooling medium from the pump to the stator; a second passage that supplies the cooling medium from the pump to the rotor; and a valve that regulates a flow of the cooling medium of the first passage and a flow of the cooling medium of the second passage, wherein a cooling state of the stator and a cooling state of the rotor are controlled by the valve.

From US 2019/0229582 A1, a vehicle drive device is known with a lubricating path including a first oil pump to pump up an oil stored in the casing by the first oil pump and to supply the oil to the power transmission mechanism for lubricating the power transmission mechanism, and a cooling path that is separated from the lubricating circuit and provided for the rotating electric machine, the cooling path including a second oil pump to pump up the oil stored in the casing by the second oil pump to supply the oil exclusively to the rotating electric machine for cooling the rotating electric machine, the second oil pump is an electric oil pump, and the cooling path is provided with an oil cooler cooling the oil to be supplied to the rotating electric machine.

From US 2016/0178548 A1, a method for dynamically monitoring temperature of a fluid at a heat generating device is known, which includes monitoring, using a temperature sensor, temperature of the fluid held in a fluidic sump. A first fluidic flow rate and a second fluidic flow rate are determined. A third fluidic flow rate and a temperature drop of the fluid across the heat exchanger in the active coolant circuit are determined based upon the temperature of the fluid and the third fluidic flow rate through the active coolant circuit. A fluid temperature supplied to the electric machine through the active coolant circuit is determined based upon the third fluidic flow rate and the temperature drop of the fluid across the heat exchanger. An effective temperature of the fluid is determined based upon the temperature of the fluid in the sump and the temperature of the fluid supplied to the electric machine through the active coolant circuit.

SUMMARY

Described herein is an electric drive for a vehicle with a housing, an electric machine, a transmission, and a hydraulic circuit for circulating a fluid.

The electric machine and the transmission of the electric drive for the vehicle have different cooling and lubrication requirements, which depend on operation conditions. A performance of the electric machine is thermally limited in operation. Inherent losses may occur in the copper, iron and magnets of electric motors, where material properties limit the temperatures of the respective components and structures. Effective cooling is necessary to achieve adequate torque performance. A passive splash lubrication of the transmission results in churning losses under high-speed operation. The combination of cooling and lubrication for both the electric machine and the transmission is a compromise with regard to efficiency.

An electric drive for a vehicle is described with a hydraulic circuit for circulating a fluid for efficient cooling and lubrication of the electric machine and the transmission.

An electric drive for a vehicle comprises: a housing and an electric machine with a stator connected to the housing and including stator end-windings. The electric machine includes a rotor rotatable relative to the stator and a driveshaft connected to the rotor and rotatably supported in the housing about an axis of rotation. The electric drive has a transmission to transmit a rotary movement from the driveshaft to drive a driveline of the vehicle. The electric drive has a hydraulic circuit for circulating a fluid. The hydraulic circuit includes a pump hydraulically connected to a reservoir, a mode control valve hydraulically connected to the pump, a hydraulic stator path connecting the mode control valve with a portion of the electric machine to supply fluid to the stator, and a hydraulic transmission path connecting the mode control valve with a portion of the transmission.

The mode control valve is controllable such that in a low speed mode the stator end-windings of the electric machine are supplied with fluid via the hydraulic stator path, and in a high speed mode the transmission is supplied with fluid via the hydraulic transmission path.

An advantage of the electric drive is that the two modes of the hydraulic circuit can optimize the cooling and lubrication of the electric machine and the transmission. The high speed mode can advantageously be applied for high speed operation of the vehicle and accordingly high rotation speed of the rotor and the transmission parts. The low speed mode can advantageously be applied for low speed operation of the vehicle and accordingly lower rotation speed of the rotor and the transmission parts, compared to the high speed mode. The fluid circulated in the hydraulic circuit is a cooling and lubricating fluid, like, e.g., an oil. The reservoir, which may be referred to as an oil sump, is arranged to gather fluid which drips off the electric machine and the transmission due to gravitational force.

In the low speed mode, high torque requirements are common and high currents result in copper losses. Supplying the fluid via the hydraulic stator path in the low speed mode to the stator end-windings of the electric machine effectively cools the stator end-windings, thus reducing the losses. A high-pressure spray cooling of the winding heads is possible in the low speed mode, while the lubrication of the transmission in the low speed mode does not require active fluid supply. The passive splash lubrication of the transmission in the low speed mode is effective as churning losses are low under low rotation speed.

In the high speed mode, the torque requirements of the electric machine are lower and spray cooling of the winding heads is not necessary. Instead, active lubrication of the transmission components running at high speed can advantageously be achieved by supplying fluid via the hydraulic transmission path to a portion of the transmission, which means that not every component or portion of the transmission is supplied via the hydraulic transmission path. A final drive, for example, may still be passively splash lubricated.

According to an embodiment, the housing can include an intermediate wall, which separates the reservoir into a motor-side reservoir and a transmission-side reservoir. A reservoir control valve is arranged in a through-opening of the intermediate wall to selectively open or close the through-opening. The motor-side reservoir gathers the fluid dripping off the electric machine and also a fraction of the fluid dripping off the transmission. The transmission-side reservoir gathers a fraction of the fluid dripping off the transmission. The reservoir control valve can advantageously be controllable such that the through-opening in the low speed mode is open and in the high speed mode is closed. With the through-opening open, the fluid level of the motor-side reservoir and the transmission-side reservoir is balanced, the transmission-side reservoir containing enough fluid for passively splash lubricating the transmission. When the through-opening is closed, the fluid level of the motor-side reservoir increases, resulting in a lower fluid level of the transmission-side reservoir. The lower fluid level reduces churning losses, for instance of the final drive, which may still be passively lubricated in the high speed mode. In the low speed mode, the transmission is only passively supplied with fluid from the transmission-side reservoir, and a fluid level in the transmission-side reservoir may be higher in the low speed mode than in the high speed mode.

According to a further embodiment, the hydraulic transmission path comprises a branch conduit to an inner diameter of the driveshaft. As the active lubrication of the transmission does not require high-pressure fluid supply, in the high speed mode the electric machine can be supplied via the driveshaft with low-pressure coolant fluid. The electric machine is supplied with fluid in the high speed mode via radial bores of the driveshaft connecting the inner diameter with the rotor. The rotor is cooled and the fluid is further centrifuged toward the stator and the stator end-windings, which are thus also cooled.

According to a further embodiment, the mode control valve is a three-way two-position directional valve, which in the high speed mode is in a normal position and in the low speed mode is in an actuated position. The normal position is the position into which the valve returns without external actuation, which can be achieved by a bias spring, for example. Advantageously, in case of a control failure of the mode control valve, it remains in the high speed mode, providing sufficient lubrication of the transmission running in high speed rotation and thus preventing damage, while a lack of high-pressure spray cooling of the stator end-windings under low speed conditions does not implicate damage, only higher losses. The reservoir control valve may be, in at least one embodiment, a two-way two-position directional valve, which, in the high speed mode is in a normal position, i.e., the closed position, and in the low speed mode is in an actuated position, i.e., the open position.

According to an embodiment, the mode control valve can be electromagnetically actuated, the low speed mode and the high speed mode thus being set by an external electric current driving the electromagnet of the mode control valve. The reservoir control valve can advantageously be actuated hydraulically in dependence of the position of the mode control valve. For example, a hydraulic pressure line can connect the reservoir control valve to the hydraulic stator path. If the hydraulic stator path is supplied with fluid in the low speed mode, the reservoir control valve is actuated from the normal position into the actuated position by the pressure in the hydraulic stator path via the hydraulic pressure line, thus opening the through-hole.

According to an alternative embodiment, the mode control valve can be hydraulically actuated and the pump is a bidirectional pump. Whether the mode control valve is actuated or not may depend on a pumping direction of the pump. One pumping direction of the pump results in the mode control valve being actuated, i.e., in the actuated position for the low speed mode. Switching the pump to the reverse pumping direction can result in the mode control valve returning to the normal position for the high speed mode. A fluid supply line hydraulically connecting the reservoir to the pump can be divided into two branches upstream of the pump. A first branch of the two branches is connected to a first suction side inlet of the pump in the high speed mode and a second branch of the two branches is connected to a second suction side inlet of the pump in the low speed mode. The first suction side inlet of the pump may be a pressure outlet of the pump in the low speed mode and the second suction side inlet of the pump may be the pressure outlet of the pump in the high speed mode, respectively. To supply the fluid further from the respective pressure outlet to the mode control valve, the two branches can be reunited in a junction downstream of the pump and upstream of the mode control valve.

According to a further embodiment, the two branches comprise a check valve arrangement establishing, in the high speed mode, a fluid flow from the first branch to the first suction side inlet, through the pump into the second branch and to the junction. In the low speed mode, the fluid flow is established from the second branch to the second suction side inlet, through the pump into the first branch to the junction. The check valve arrangement may comprise two check valves per each of the two branches, the respective first and second suction side inlets each being located between the two check valves of the respective branch. The check valve arrangement may further be adapted to allow a flow through each of the two branches only in a direction from the reservoir towards the junction.

The hydraulically actuated mode control valve may comprise a hydraulic pressure line connected to the first branch, in order to be hydraulically actuated by a pressure in the first branch. The mode control valve is actuated, i.e., shifted into the actuated position, when the first branch is supplied with fluid from the pressure outlet of the pump in the low speed mode. When the pumping direction of the pump is reversed for the high speed mode, the first branch is connected to the first suction side inlet of the pump, resulting in the mode control valve returning to the normal position.

In this embodiment, the hydraulically actuated reservoir control valve may be actuated via a hydraulic pressure line connected to the first branch.

BRIEF DESCRIPTION OF THE DRAWINGS

Exemplary embodiments and further advantages of the electric drive for a motor vehicle will be illustrated as follows with reference to the accompanying drawings.

DETAILED DESCRIPTION

Figure 1:
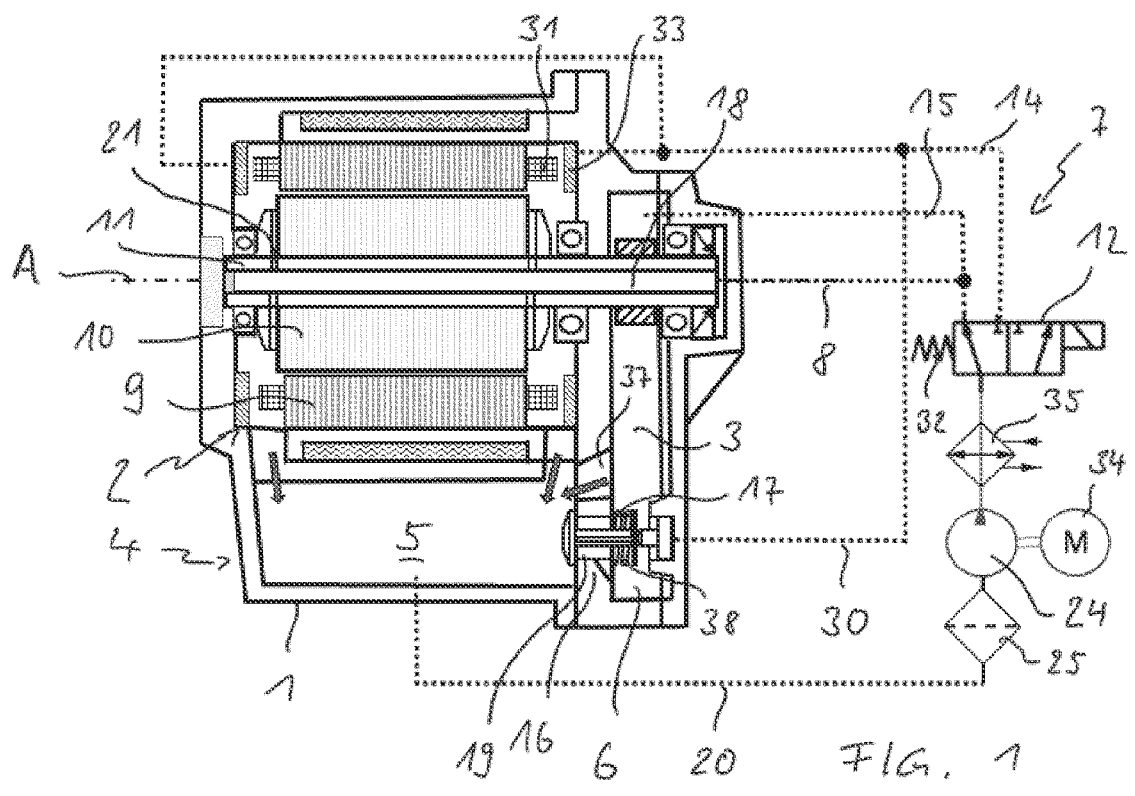
FIG. 1 shows a schematic illustration of a first exemplary embodiment of an electric drive.

In FIG. 1, an electric drive for a motor vehicle is depicted, wherein a housing 1, an electric machine 2, a transmission 3 and a reservoir 4 are shown as a schematic representation of a longitudinal cut along a rotary axis A of a rotor 10 of the electric machine 2. The electric machine 2 has a stator 9 connected to the housing 1 and including stator end-windings 31, and the rotor 10 being rotatable relative to the stator 9. A driveshaft 11 is connected to the rotor 10 and rotatably supported in the housing 1 about the axis of rotation A. The transmission 3 is adapted to transmit a rotary movement from the driveshaft 11 to drive a driveline of the vehicle, which is not depicted. The transmission 3 may comprise, for example, a reduction gear, a differential drive and a coupling, which are not depicted. A hydraulic circuit 7 is schematically depicted, comprising a pump 24 hydraulically connected to the reservoir 4 via a fluid supply line 20, a mode control valve 12 hydraulically connected to the pump 24, a hydraulic stator path 14 connecting the mode control valve 12 with a portion of the electric machine 2 to supply fluid to the stator 9, and a hydraulic transmission path 15 connecting the mode control valve 12 with a portion of the transmission 3. The mode control valve 12 is controllable such that in a low speed mode stator end-windings 31 of the electric machine 2 are supplied with fluid via the hydraulic stator path 14, and in a high speed mode the transmission 3 is supplied with fluid via the hydraulic transmission path 15. The two modes of the hydraulic circuit 7 provide optimized cooling and lubrication of the electric machine 2 and the transmission 3, e.g., depending on the operating conditions of the electric drive. The pump 24 is driven by an electric motor 34. Upstream of the pump 24, a suction filter 25 is arranged, and downstream of the pump 24, the fluid may be cooled in a heat exchanger 35.

The housing 1 includes an intermediate wall 16 which separates the reservoir 4 into a motor-side reservoir 5 and a transmission-side reservoir 6. A reservoir control valve 17 is arranged in a through-opening 19 of the intermediate wall 16 to selectively open or close the through-opening 19. In the low speed mode the transmission 3 is supplied with fluid passively from the transmission-side reservoir 6. The fluid level in the transmission-side reservoir 6 is higher in the low speed mode to provide adequate splash lubrication, whereas in the high speed mode, the fluid level in the transmission-side reservoir 6 is reduced to keep churning losses low. The hydraulic transmission path 14 comprises a branch conduit 8 to an inner diameter 18 of the driveshaft 11 to supply the electric machine 2 with cooling fluid in the high speed mode as well, which is administered via radial bores 21 of the driveshaft 11 connecting the inner diameter 18 with the rotor 10. The fluid is centrifuged along the rotor 10 towards the stator 9, including the stator end-windings 31, and flows back into the machine-side reservoir 5 due to gravitational force.

In the depicted embodiment, the mode control valve 12 is an electromagnetically actuated three-way two-position directional valve. The reservoir control valve 17 is a two-way two-position directional valve, which is hydraulically actuated via a hydraulic pressure line 30 connected to the hydraulic stator path 14. The actuation of the reservoir control valve 17 thus depends on the operation mode, which is determined by the position of the mode control valve 12.

Figure 2:
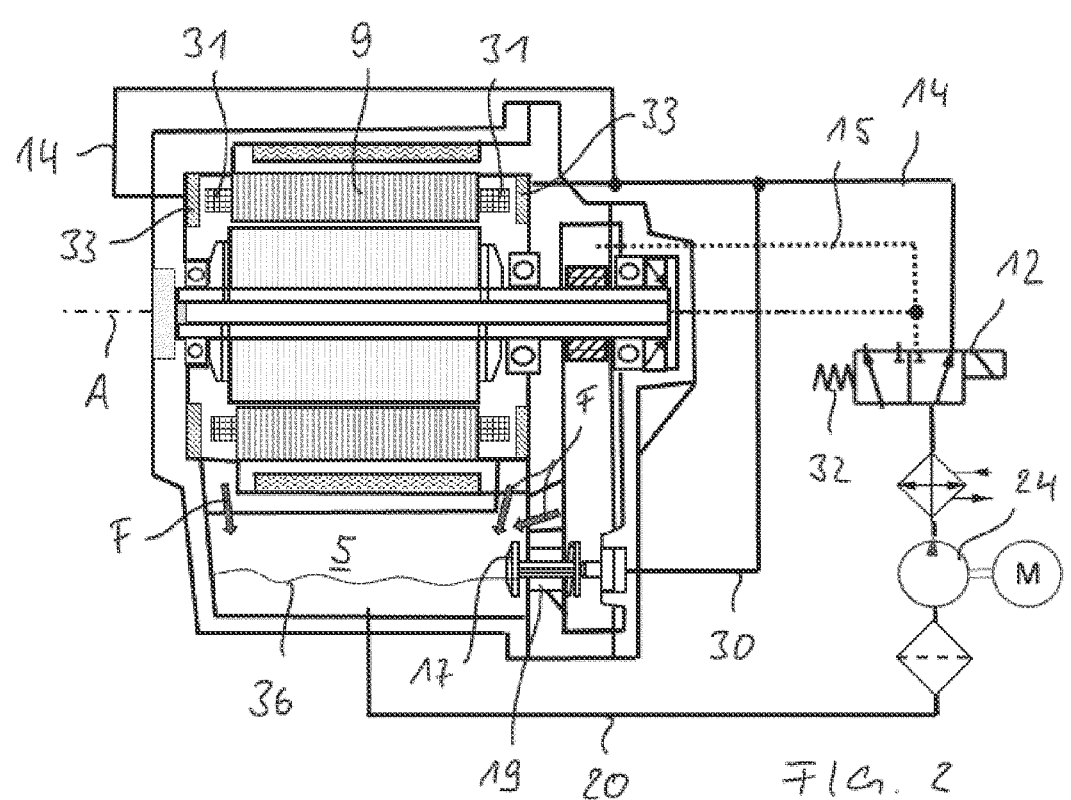
FIG. 2 shows a schematic illustration of the embodiment of FIG. 1 in a low speed mode.

With regard to FIG. 2, which shows the electric drive of FIG. 1 with the hydraulic circuit 7 in the low speed mode. Hydraulically connected lines are shown with a dot representing a junction. Crossing lines without a junction dot are hydraulically separated. The hydraulic connection lines which are not pressurized by the pump 24 and do not supply fluid are depicted as dashed lines, whereas the full lines represent the pressurized connection lines supplying fluid in the low speed mode. The mode control valve 12 in the low speed mode is in its actuated position due to the applied electromagnetic force working against a spring 32 biasing the mode control valve 12 towards its normal position. The mode control valve 12 in the low speed mode directs the fluid flow from the pump 24 to the hydraulic stator path 14, which supplies spray nozzles 33 to spray the fluid under high pressure towards the stator end-windings 31 of the electric machine 2, from there the fluid flows back to the machine-side reservoir 5. Arrows F illustrate the flow of the fluid into the machine-side reservoir 5. A passage 37 in the intermediate wall 16 above the through-opening 19 also allows fluid dripping off the transmission 3 to flow into the machine-side reservoir 5. However, as the through-opening 19 in the low speed mode is open, a fluid level 36 in the machine-side reservoir 5 is balanced with the fluid level in the transmission-side reservoir 6. The reservoir control valve 17 is a two-way two-position directional valve which is in the actuated position in the low speed mode, thus opening the through-opening 19. The hydraulic pressure line 30 connected to the hydraulic stator path 14 is pressurized as the fluid flow is directed to the hydraulic stator path 14 by the mode control valve 12. The hydraulic transmission path 15 is not pressurized and no fluid is actively transported to the transmission 3, which is splash lubricated from the transmission-side reservoir 6. The low speed mode can advantageously be applied for low speed operation of the vehicle and accordingly lower rotation speed of the rotor 10 and rotating parts of the transmission 3.

Figures 3, 4:
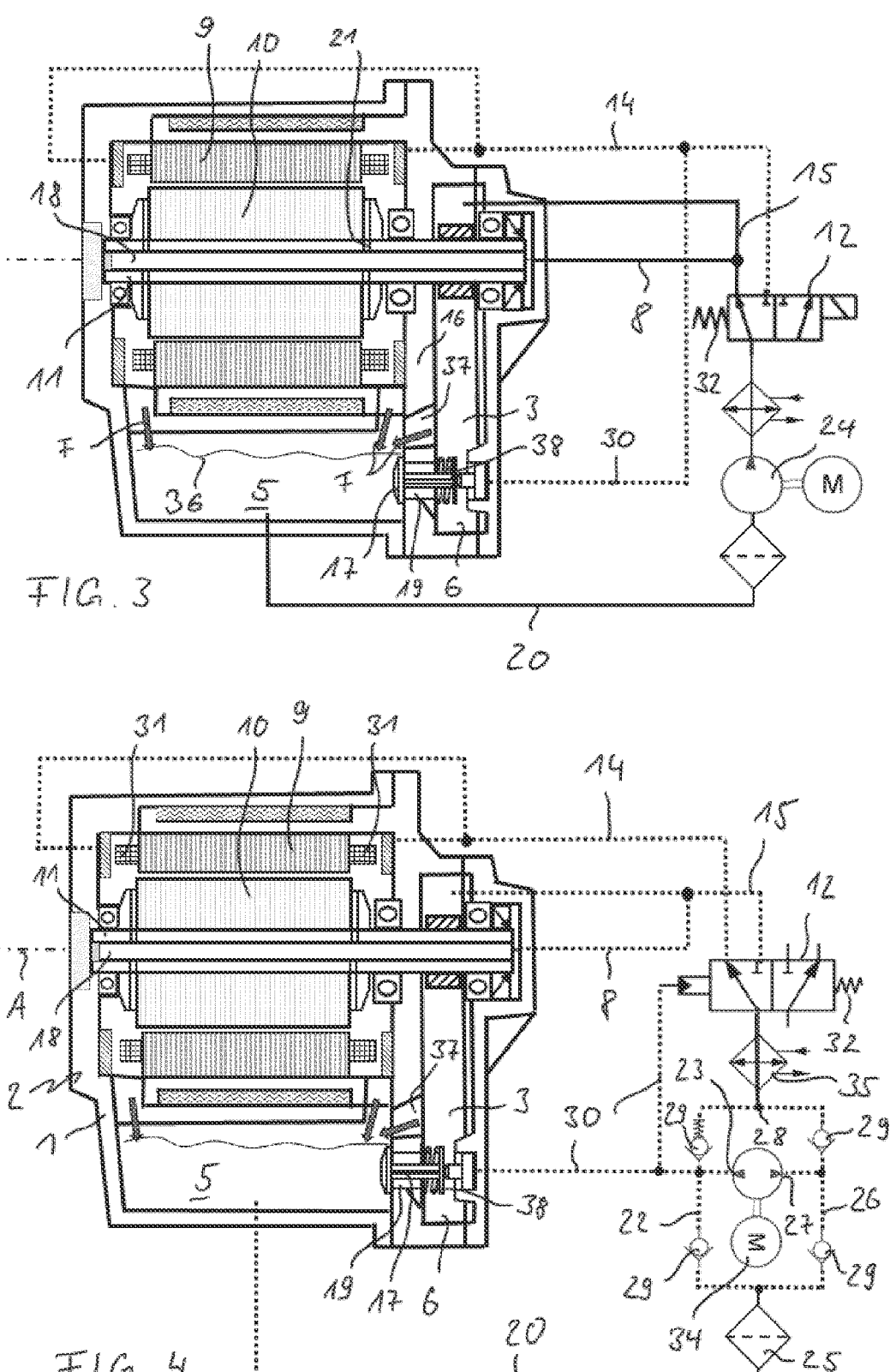
FIG. 3 shows a schematic illustration of the embodiment of FIG. 1 in a high speed mode.
FIG. 4 shows a schematic illustration of a second exemplary embodiment of the electric drive in a schematic illustration.

FIG. 3 shows the electric drive of FIG. 1 with the hydraulic circuit 7 in the high speed mode. The mode control valve 12 in the high speed mode is not actuated and is held in its normal position by the biasing spring 32. The mode control valve 12 in the low speed mode directs the fluid flow from the pump 24 to the hydraulic transmission path 15, which actively supplies the transmission 3 with lubricating fluid. The branch conduit 8 of hydraulic transmission path 14 also supplies fluid to the inner diameter 18 of the driveshaft 11 of the electric machine 2 for cooling. From the transmission 3, fluid runs back into the reservoir 4, a fraction of it into the transmission-side reservoir 6 and another fraction of it through the passage 37 in the intermediate wall 16 into the machine-side reservoir 5. The hydraulic stator path 14 is not pressurized and thus the reservoir control valve 17 is not actuated via the pressure line 30. The reservoir control valve 17 is held in its normal position by a spring 38, thus closing the through-opening 19. This results in an increased fluid level 36 in the machine-side reservoir 5 and a reduced fluid level in the transmission-side reservoir 6 compared to the machine-side reservoir 5. The high speed mode can advantageously be applied for high speed operation of the vehicle and accordingly high rotation speed of the rotor 10 and rotating parts of the transmission 3.

In FIG. 4, a second exemplary embodiment of the electric drive is shown in an identical schematic illustration as the first embodiment. Identical parts are denoted with the same reference numerals. The electric drive according to the second embodiment is further identical with regard to the housing 1, the electric machine 2, the transmission 3 and the reservoir 4, which are not described in detail again. Reference is made to the description above.

The hydraulic circuit 7 of the second embodiment comprises a pump 24, which is a bidirectional pump 24. Further, the mode control valve 12 is hydraulically actuated and depending on a pumping direction of the bidirectional pump 24, the mode control valve 12 is actuated between the low speed mode and the high speed mode. The fluid supply line 20 hydraulically connecting the reservoir 4 to the bidirectional pump 24 is divided into two branches, a first branch 22 connected to a first suction side inlet 23 of the pump 24 and a second branch 26 connected to a second suction side 27 inlet of the pump 24. One of the first and second suction side inlets 23, 27 provides the suction side of the pump 24, depending on the speed mode, whereas the respective other one provides the pressure outlet of the pump 24. In the high speed mode the first suction side inlet 23 applies, and in the low speed mode the second suction side inlet 27 applies. The two branches 22, 26 are reunited at a junction 28 downstream of the pump 24. The two branches 22, 26 comprise a check valve arrangement 29 with two check valves in each of the two branches 22, 26, the respective first and second suction side inlets 23, 27 being each located between the two check valves, respectively, the check valve arrangement 29 being adapted to allow a flow through each of the two branches 22, 26 only in a direction from the reservoir 4 towards the junction 28. The mode control valve 12 is hydraulically actuated via the hydraulic pressure line 30, which in this embodiment is connected to the first branch 22. The reservoir control valve 17 is hydraulically actuated via the hydraulic pressure line 30 connected to the first branch 22. The hydraulic stator path 14 connects the mode control valve 12 with a portion of the electric machine 2 to supply fluid to the stator 9, and the hydraulic transmission path 15 connects the mode control valve 12 with a portion of the transmission 3. The bidirectional pump 24 is driven by the electric motor 34. The suction filter 25 is arranged upstream of the pump 24, and the fluid may be cooled by the heat exchanger 35 downstream of the pump 24.

Figures 5, 6:
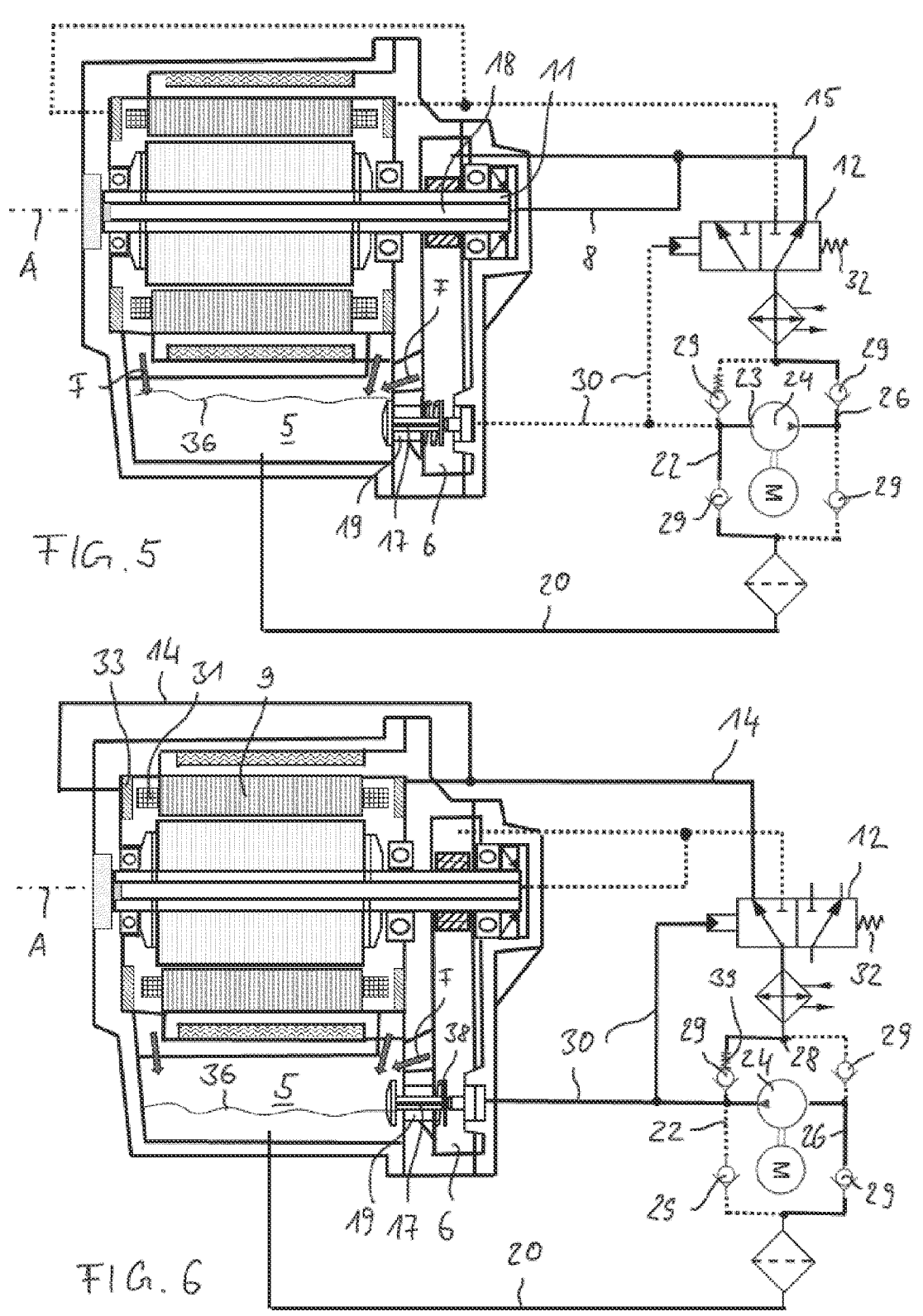
FIG. 5 shows a schematic illustration of the embodiment of FIG. 4 in a high speed mode.
FIG. 6 shows a schematic illustration of the embodiment of FIG. 4 in a low speed mode.

FIG. 5 shows the electric drive of FIG. 4 with the hydraulic circuit 7 in the high speed mode. The mode control valve 12 directs the fluid flow from the pump 24 to the hydraulic transmission path 15, which actively supplies the transmission 3 with lubricating fluid. The branch conduit 8 of hydraulic transmission path 15 also supplies fluid to the inner diameter 18 of the driveshaft 11 of the electric machine 2 for cooling. The mode control valve 12 in the high speed mode is not actuated and is held in its normal position by the biasing spring 32. The check valve arrangement 29 establishes a fluid flow from the first branch 22 to the first suction side inlet 23, through the pump 24 into the second branch 26 to the junction 28 in the high speed mode. The hydraulic pressure line 30 connected to the first branch 22 is not pressurized by the pump 24, as the first branch 22 forms the suction side of the pump 24. Also the reservoir control valve

17 is not actuated, but is biased towards its normal position by the spring 38, thus closing the through-opening 19 of the interior wall 16.

By reversing the pumping direction of the bidirectional pump 24, the the hydraulic circuit 7 changes into the low speed mode, as illustrated in FIG. 6. The downstream check valve in the first branch 22 is biased towards its closed position by a check valve spring 39 to build up a pressure in the pressure line 30. The check valve spring 39 is adapted to keep the check valve closed at the moment when the pump direction is reversed. By pressurizing the first branch 22, the mode control valve 12 and the reservoir control valve 17 are both actuated via the pressure line 30 into their respective actuated positions against the biasing forces of the springs 32, 38. The reservoir control valve 17 opens the through-opening 19 and the mode control valve 12 directs the fluid flow to the hydraulic stator path 14. Then the check valve 29 with the check valve spring 39 may open as well, and the check valve arrangement 29 may establish a fluid flow from the second branch 26 to the second suction side inlet 27, through the pump 24 into the first branch 22 to the junction 28 in the low speed mode.

The depicted parts and features of all the exemplary embodiments of the electric drive are schematic representations, which may deviate from engineering drawing standards. Regarding the function and technical details of the parts and features, the description takes precedence over the drawings.

REFERENCE NUMERALS

1 Housing
2 Electric machine
3 Transmission
4 Reservoir
5 Motor-side reservoir
6 Transmission-side reservoir
7 Hydraulic circuit
8 Branch conduit
9 Stator
10 Rotor
11 Driveshaft
12 Mode control valve
14 Hydraulic stator path
15 Hydraulic transmission path
16 Intermediate wall
17 Reservoir control valve
18 Inner diameter of the rotor shaft
19 Through-opening
20 Fluid supply line
21 Radial bore
22 First branch
23 First suction side inlet
24 Pump
25 Filter
26 Second branch
27 Second suction side inlet
28 Junction
29 Check valve arrangement
30 Hydraulic pressure line
31 Stator end windings
32 Spring
33 Spray nozzles
34 Electric motor
35 Heat exchanger
36 Fluid level
37 Passage 38 Spring
39 Check valve spring
A Rotary axis
F Arrows
The invention claimed is:

1. An electric drive for a vehicle, comprising:
a housing,
an electric machine with a stator connected to the housing and including stator end-windings, a rotor rotatable relative to the stator, and a driveshaft connected to the rotor and rotatably supported in the housing about an axis of rotation,
a transmission to transmit a rotary movement from the driveshaft to drive a driveline of the vehicle, and
a hydraulic circuit for circulating a fluid, the hydraulic circuit comprising a pump hydraulically connected to a reservoir, a mode control valve hydraulically connected to the pump, a hydraulic stator path connecting the mode control valve with a portion of the electric machine to supply fluid to the stator, and a hydraulic transmission path connecting the mode control valve with a portion of the transmission,
wherein the mode control valve is controllable such that in a low speed mode the stator end-windings of the electric machine are supplied with fluid via the hydraulic stator path, and in a high speed mode the transmission is supplied with fluid via the hydraulic transmission path.

2. The electric drive according to claim 1, wherein the housing includes an intermediate wall which separates the reservoir into a motor-side reservoir and a transmission-side reservoir, and wherein a reservoir control valve is arranged in a through-opening of the intermediate wall to selectively open or close the through-opening.

3. The electric drive according to claim 2, wherein the reservoir control valve is controllable such that the through-opening in the low speed mode is open and in the high speed mode is closed.

4. The electric drive according to claim 2, wherein in the low speed mode the transmission is supplied with fluid passively from the transmission-side reservoir, and wherein a fluid level in the transmission-side reservoir is higher in the low speed mode than in the high speed mode.

5. The electric drive according to claim 2, wherein the reservoir control valve is a two-way two-position directional valve, and wherein the reservoir control valve in the high speed mode is in a normal position and in the low speed mode is in an actuated position.

6. The electric drive according to claim 2, wherein the mode control valve is electromagnetically actuated, and wherein the reservoir control valve is hydraulically actuated via a hydraulic pressure line connected to the hydraulic stator path.

7. The electric drive according to claim 1, wherein the hydraulic transmission path comprises a branch conduit to an inner diameter of the driveshaft.

8. The electric drive according to claim 7, wherein the driveshaft comprises radial bores connecting the inner diameter to the rotor for supplying the electric machine with fluid in the high speed mode.

9. The electric drive according to claim 1, wherein the mode control valve is a three-way two-position directional valve, and wherein the mode control valve in the high speed mode is in a normal position and in the low speed mode is in an actuated position.

10. The electric drive according to claim 9, wherein the mode control valve is hydraulically actuated, wherein the pump is a bidirectional pump, and wherein the mode control valve is actuated depending on a pumping direction of the pump.

11. The electric drive according to claim 10, wherein a fluid supply line hydraulically connecting the reservoir to the pump is divided into two branches, a first branch connected to a first suction side inlet of the pump in the high speed mode and a second branch connected to a second suction side inlet of the pump in the low speed mode, wherein the two branches are reunited in a junction downstream of the pump.

12. The electric drive according to claim 11, wherein the first and second branches comprise a check valve arrangement establishing a fluid flow from the first branch to the first suction side inlet, through the pump into the second branch to the junction in the high speed mode; and a fluid flow from the second branch to the second suction side inlet, through the pump into the first branch to the junction in the low speed mode.

13. The electric drive according to claim 12, wherein the check valve arrangement comprises two check valves per each of the first and second branches, the respective first and second suction side inlets being each located between the two check valves, respectively, and wherein the check valve arrangement is adapted to allow a flow through each of the two branches only in a direction from the reservoir towards the junction.

14. The electric drive according to claim 11, wherein the mode control valve is hydraulically actuated via a hydraulic pressure line connected to the first branch.

15. The electric drive according to claim 11, wherein the reservoir control valve is hydraulically actuated via a hydraulic pressure line connected to the first branch.

16. An electric drive for a vehicle, comprising:
a housing,
an electric machine with a stator connected to the housing and including stator end-windings, a rotor rotatable relative to the stator, and a driveshaft connected to the rotor and rotatably supported in the housing about an axis of rotation,
a transmission to transmit a rotary movement from the driveshaft to drive a driveline of the vehicle, and
a hydraulic circuit for circulating a fluid, the hydraulic circuit comprising a pump hydraulically connected to a reservoir, a mode control valve hydraulically connected to the pump, a hydraulic stator path connecting the mode control valve with a portion of the electric machine to supply fluid to the stator, and a hydraulic transmission path connecting the mode control valve with a portion of the transmission,
wherein the mode control valve is controllable such that in a low speed mode the stator end-windings of the electric machine are supplied with fluid via the hydraulic stator path, and in a high speed mode the transmission is supplied with fluid via the hydraulic transmission path, and
wherein the housing includes an intermediate wall which separates the reservoir into a motor-side reservoir and a transmission-side reservoir, wherein a reservoir control valve is arranged in a through-opening of the intermediate wall to selectively open or close the through-opening.

17. An electric drive for a vehicle, comprising:
a housing,
an electric machine with a stator connected to the housing and including stator end-windings, a rotor rotatable relative to the stator, and a driveshaft connected to the rotor and rotatably supported in the housing about an axis of rotation, a transmission to transmit a rotary movement from the driveshaft to drive a driveline of the vehicle, and a hydraulic circuit for circulating a fluid, the hydraulic circuit comprising a pump hydraulically connected to a reservoir, a mode control valve hydraulically connected to the pump, a hydraulic stator path connecting the mode control valve with a portion of the electric machine to supply fluid to the stator, and a hydraulic transmission path connecting the mode control valve with a portion of the transmission, wherein the mode control valve is controllable such that in a low speed mode the stator end-windings of the electric machine are supplied with fluid via the hydraulic stator path, and in a high speed mode the transmission is supplied with fluid via the hydraulic transmission path, wherein the mode control valve is a three-way two-position directional valve, which in the high speed mode is in a normal position and in the low speed mode is in an actuated position, and wherein the mode control valve is hydraulically actuated, wherein the pump is a bidirectional pump, the mode control valve being actuated depending on a pumping direction of the pump.

* * * * *